…

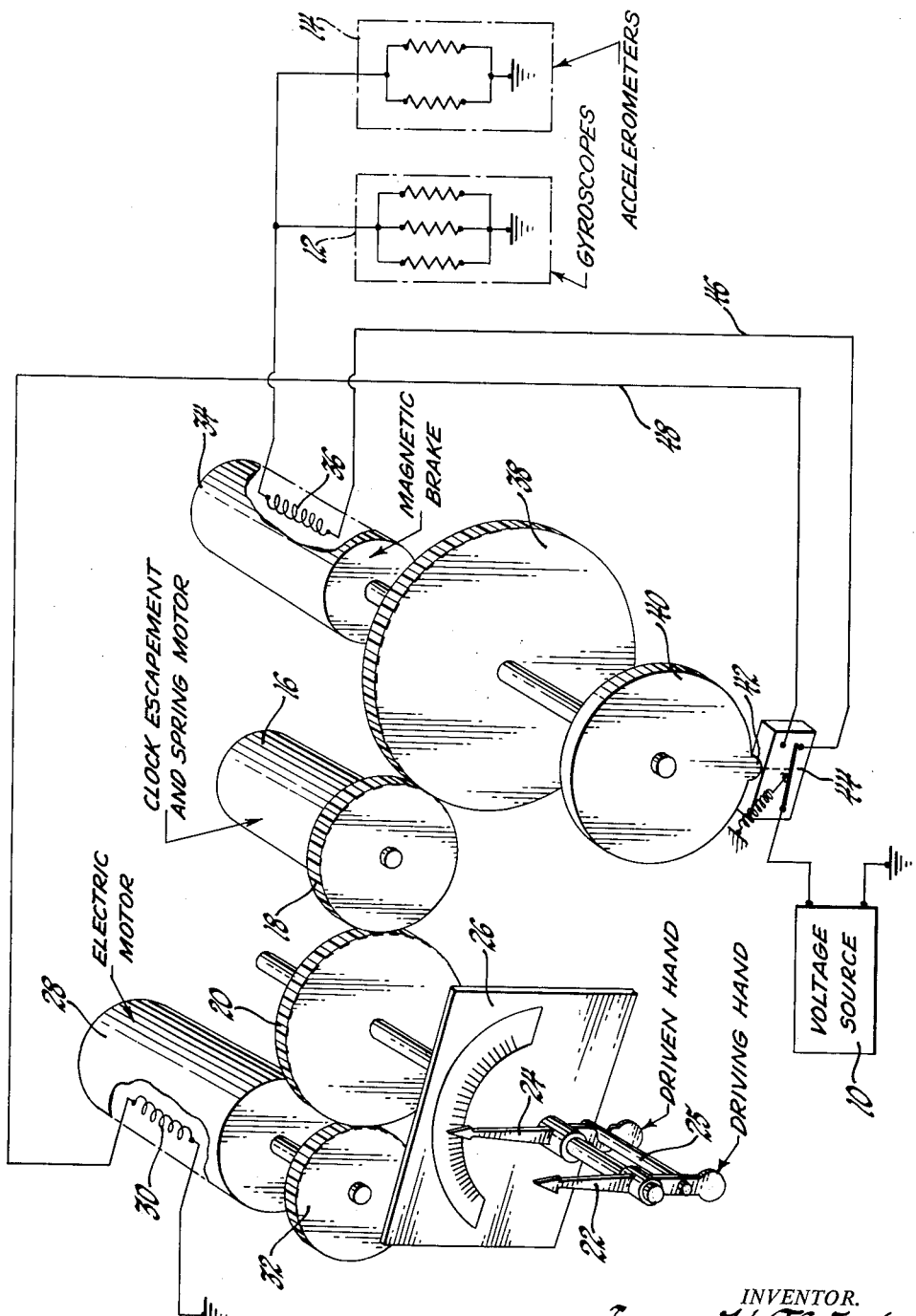

United States Patent Office 3,056,254
Patented Oct. 2, 1962

3,056,254
SYSTEM FOR INDICATING MAXIMUM DURATION OF POWER FAILURE
James H. Flaherty, Milwaukee, Wis., assignor to General Motors Corporation, Detroit, Mich., a corporation of Delaware
Filed Nov. 28, 1958, Ser. No. 776,815
5 Claims. (Cl. 58—145)

This invention relates to elapsed time indicators and more particularly to such indicators for measuring the maximum duration or interval of several power interruptions.

In many applications, it is desirable to produce an indication of the greatest interval of time during which equipment is inoperative. A particular example is precision instruments, such as gyroscopes, accelerometers and the like, which are used in navigation systems for aircraft and missiles.

Such instruments, as presently designed, are maintained at constant temperature, from the time of calibration, in order to stabilize the operating characteristics which may be disturbed, for example, by introduction of unbalances due to temperature cycling. This temperature stabilization is usually accomplished by an electrical resistance heater which is energized during the calibration phase of manufacture and is kept energized during transportation, storage, and use of the instruments. During such periods, there is always a risk of power supply failure of extended duration which will result in temperature change and render the instrument useless until it is re-calibrated. Power supply failures of short duration may be tolerated, even though the failures may occur repeatedly, but a failure of extended duration will result in excessive temperature change and cannot be tolerated.

It is therefore necessity to monitor the electrical power supply for the instruments but conventional elapsed time indicating systems are inadequate because they measure the total "down" time, i.e. the summation of intervals for all power supply failures and therefore an unattended system does not show the maximum interval of power failure.

In accordance with this invention, the maximum interval of power failure is indicated and intervals of down time of less than a predetermined interval, even though repeated, do not disturb the indication of the maximum interval. This is accomplished by a timing mechanism which is immobilized by a brake energized by the power supply being monitored. Upon the failure of the power supply, the timing mechanism begins to run and drives an indicating hand through a unidirectional coupling. When the power supply is restored to operation, a rewind motor is energized to reset the timing mechanism, leaving the indicating hand in its advanced position, and the brake is energized to prevent the timing mechanism from running.

A more complete understanding of this invention may be had from the detailed description which follows taken with the accompanying drawings in which the single figure is a diagrammatic representation of the inventive system.

Referring now to the drawing, the system comprises a voltage source 10 for energizing the particular utilization apparatus including the resistance heater elements of gyroscopes 12 and the resistance heater elements of the accelerometers 14. The voltage source 10 is subject to intermittent failures and the inventive maximum time interval indicating system is provided to indicate the greatest interval of failure.

A timing mechanism 16, of conventional design including a spring motor and escapement, provides constant speed drive through gears 18 and 20 to the indicator shaft upon which is fixedly mounted a driving indicator or hand 22. A driven indicator or hand 24 is mounted upon the shaft for rotation relative to the shaft and is coupled by a unidirectional drive or arm 25 with the hand 22 for forward movement therewith. Both the driving and the indicating hands are movable over the scale 26 which is calibrated in units of time.

For the purpose of rewinding the timing mechanism 16 and returning the driving hand 22 to zero, a motor 28 having an energizing coil 30 is coupled through gear 32 to the gear 20. To stop the timing mechanism 16 from running, a magnetic brake 34 having an energizing coil 36 is coupled through the gear 38 to the gear 18. Upon the shaft of the brake 34 is mounted a cam 40 having a single lobe 42 which engages a switch 44 in the reference position of the shaft, as shown in the drawings. The switch is suitably a single pole-double throw switch having its movable contact actuable into engagement with its back fixed contact by a bias spring and actuable into engagement with its front fixed contact by the cam lobe 42.

The energizing circuits for the system comprise the voltage source 10 with one terminal connected to ground and the other terminal connected to the movable contact of the switch 44. The energizing circuit for the resistance heater elements of the gyroscopes and accelerometers 12 and 14 extends from the front contact of switch 44 through conductor 46, the energizing coil 36 of brake 34 and thence through the resistance heater elements to ground. The energizing circuit for the motor 28 extends from the back contact through conductor 48 and energizing coil 30 to ground.

In considering the operation, assume that the power source 10 is operative and the cam 40 is in its reference position and the spring motor of timing mechanism 16 is fully wound. Accordingly, the switch 44 is closed against the front fixed contact and the brake 34 is energized and power is supplied to resistance heaters of the gyroscopes and accelerometers 12 and 14. Accordingly, the timing mechanism 16 is prevented from running. Upon a failure of the power source 10, the resistance heaters are deenergized and the brake 34 is deenergized which permits the timing mechanism 16 to commence running and the gear 18 through the gear 20 drives the hand 22. Accordingly, the indicating hand 24 is driven concurrently, through the arm 25. The gear 38 is driven by the timing mechanism through gear 18 and the cam lobe 42 is displaced permitting the switch 44 to engage the back fixed contact. Therefore, when the voltage source 10 is restored, the motor 28 is energized through conductor 48 and energizing coil 30 causing the driving hand 22 to be driven in a counterclockwise direction which leaves the indicating hand 24 in its advanced position. During the energization of the motor 28, the gear 20 also drives the timing mechanism 16 through gear 18 in the reverse direction to rewind the spring motor. Concurrently, the gear 38 is driven to return the cam 40 to its reference position in which the cam lobe 42 displaces the movable contact of switch 44 into engagement with the front fixed contact. This reenergizes the resistance heaters of the gyroscopes 12 and accelerometers 14 and the brake 34 which prevents the timing mechanism from running while the power source is operative. The system is now in readiness to indicate the time duration of a subsequent power failure. It is now apparent that the indicating hand 24 remains in its most advanced position and indicates the maximum interval time of power failure.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. A system for indicating the maximum time duration of successive failures of a power source, the system comprising a timing device, an indicating element coupled with the timing device by a unidirectional drive means, means responsive to the power source and operatively connected with the indicating element to hold it when the power source is operative and release it when the power source fails, and means responsive to the power source and operatively connected with the timing device for resetting it when the power source is restored to operative condition.

2. A system for indicating the maximum time duration of successive failures of a power source, the system comprising a timing device, an indicating element coupled with the timing device by a unidirectional drive means, control means connected with the power source, a brake connected to the control means and adapted for energization by the source and operatively connected with the indicating element to hold it when the power source is operative and release it when the power source fails, and actuating means connected to the control means and adapted for energization by the source and operatively connected with the timing device for resetting it when the power source is restored to operative condition, said control means being actuated by said timing device whereby the brake is connected with the power source when the device is in a reference position and the actuating means is connected with power source when the device is displaced from the reference position.

3. A maximum time duration indicating system comprising a voltage source to be monitored, a timing device, an indicator, unidirectional drive means coupling the indicator to the timing device, an electrically energized brake coupled with the timing device, an electric motor coupled with the timing device for resetting it, a switch for alternately connecting the voltage source with the brake and with the motor, a switch actuator connected with the timing device so that the voltage source is connected with the brake when the timing device is in its reference position to hold the timing device when the voltage source is operative and to allow it to run when the voltage source fails, and so that the voltage source is connected with the motor when the timing device is running and the source is inoperative whereby the motor resets the timing device to its reference position when the voltage source is restored to operative condition, leaving the indicator in its most advanced position.

4. A maximum time duration indicating system comprising a voltage source to be monitored, a timing device, an indicator, unidirectional drive means coupling the indicator with the timing device, a brake coupled with the timing device and having an electrical energizing circuit, a motor coupled with the timing device for resetting it, a switch having an input terminal connected with the voltage source and a first output terminal connected with the energizing circuit of the brake, said switch also having a second output terminal connected with the motor, and a switch actuator connected with the timing device, said actuator connecting the input terminal with the first output terminal when the timing device is in its reference position to energize the brake and hold the timing device when the voltage source is operative, said brake being deenergized when the voltage source fails to allow the timing device to run whereby the actuator connects the input terminal to the second output terminal to energize the motor when the voltage source is restored to reset the timing device to its reference position leaving the indicator in its most advanced position.

5. A maximum time duration indicating system comprising a voltage source to be monitored, utilization apparatus connected therewith, a timing device, a driving indicator and a driven indicator, unidirectional drive means coupling the indicators, a brake coupled with the timing device and having an electrical energizing circuit, a motor coupled with the timing device for resetting the driving indicator, a switch having an input terminal connected with the voltage source and a first output terminal connected with the utilization means and the energizing circuit of the brake, said switch also having a second output terminal connected with the motor, and a switch actuator connected with the timing device, said actuator connecting the input terminal with the first output terminal when the timing device is in its reference position to energize the brake and hold the timing device when the voltage source is operative, said brake being deenergized when the voltage source fails to allow the timing device to run whereby the actuator connects the input terminal to the second output terminal to energize the utilization apparatus and the motor when the voltage source is restored to reset the timing device to its reference position leaving the driven indicator in its most advanced position.

References Cited in the file of this patent

UNITED STATES PATENTS

| | | |
|---|---|---|
| 2,744,573 | Judson et al. | May 8, 1956 |
| 2,774,422 | Fielding | Dec. 18, 1956 |

FOREIGN PATENTS

| | | |
|---|---|---|
| 555,470 | Germany | July 26, 1932 |
| 839,971 | France | Apr. 17, 1939 |
| 214,430 | Switzerland | July 16, 1941 |